(12) United States Patent
Lim et al.

(10) Patent No.: US 7,929,491 B2
(45) Date of Patent: Apr. 19, 2011

(54) METHOD AND APPARATUS FOR TRANSMITTING ACK/NACK INFORMATION IN AN ORTHOGONAL FREQUENCY DIVISION MULTIPLE ACCESS SYSTEM BASED ON TIME DIVISION DUPLEXING

(75) Inventors: Yeon-Ju Lim, Seoul (KR); Jae-Chen Yu, Suwon-si (KR); Jung-Soo Jung, Seongnam-si (KR); Dae-Gyun Kim, Seongnam-si (KR); Hwan-Joon Kwon, Suwon-si (KR); Dong-Hee Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 132 days.

(21) Appl. No.: 12/196,945

(22) Filed: Aug. 22, 2008

(65) Prior Publication Data

US 2009/0052356 A1 Feb. 26, 2009

(30) Foreign Application Priority Data

Aug. 22, 2007 (KR) .................. 10-2007-0084656

(51) Int. Cl.
*H04W 52/04* (2009.01)
(52) U.S. Cl. ........................ 370/328; 370/345
(58) Field of Classification Search .................. 370/329, 370/332, 280, 343; 455/445, 452
See application file for complete search history.

(56) References Cited

U.S. PATENT DOCUMENTS

| | | | |
|---|---|---|---|
| 6,611,509 B1 | 8/2003 | Hayashi et al. | |
| 0,259,629 A1 | 11/2005 | Oliver et al. | |
| 7,116,983 B2 | 10/2006 | Lan et al. | |
| 2003/0054829 A1* | 3/2003 | Moisio | 455/452 |
| 2004/0246925 A1* | 12/2004 | Wang | 370/332 |
| 2005/0276254 A1* | 12/2005 | Zhang | 370/343 |
| 2006/0205408 A1* | 9/2006 | Nakagawa et al. | 455/445 |
| 2007/0053320 A1* | 3/2007 | Rinne et al. | 370/329 |
| 2008/0095106 A1* | 4/2008 | Malladi et al. | 370/329 |
| 2008/0137562 A1* | 6/2008 | Li et al. | 370/280 |
| 2009/0040970 A1* | 2/2009 | Ahmadi et al. | 370/329 |

FOREIGN PATENT DOCUMENTS

KR 1020040043277 5/2004

\* cited by examiner

*Primary Examiner* — Kwang B Yao
*Assistant Examiner* — Syed M Bokhari
(74) *Attorney, Agent, or Firm* — The Farrell Law Firm, P.C.

(57) ABSTRACT

A method is provided for transmitting control information by a Base Station (BS) in a Time Division Duplexing (TDD)-based Orthogonal Frequency Division Multiple Access (OFDMA) system. The method includes determining a TDD ratio value of a number of time slots allocated for Forward-Link (FL) and a number of time slots allocated for Reverse-Link (RL); if the TDD ratio value is not an integer, grouping Mobile Stations (MSs) into multiple groups and generating group index information; and transmitting, to the MSs, control information including the TDD ratio value and the group index information.

13 Claims, 7 Drawing Sheets

METHOD AND APPARATUS FOR TRANSMITTING ACK/NACK INFORMATION IN AN ORTHOGONAL FREQUENCY DIVISION MULTIPLE ACCESS SYSTEM BASED ON TIME DIVISION DUPLEXING

PRIORITY

This application claims priority under 35 U.S.C. §119(a) to a Korean Patent Application filed in the Korean Intellectual Property Office on Aug. 22, 2007 and assigned Serial No. 2007-84656, the disclosure of which is incorporated herein by reference.

BACKGROUND OF THE INVENTION

1. Field of the Invention

The present invention relates generally to an Orthogonal Frequency Division Multiple Access (OFDMA) mobile communication system, and in particular, to a method and apparatus for transmitting ACK/NACK information over a reverse link in a Time Division Duplexing (TDD)-based OFDMA system.

2. Description of the Related Art

Orthogonal Frequency Division Multiplexing (OFDM) is widely applied to digital transmission technologies such as Digital Audio Broadcasting (DAB), Digital Video Broadcasting (DVB), Wireless Local Area Network (WLAN), Wireless Asynchronous Transfer Mode (WATM), etc. In particular, OFDM, which overlaps frequency spectrums, has a high frequency-efficiency and is robust against frequency selective fading and multipath fading. In addition, OFDM can reduce Inter-Symbol Interference (ISI) with use of a guard interval, and can simply design a hardware equalizer. Recently, therefore, OFDMA based on OFDM, which is suitable for high-speed data transmission in the wireless channel, is under study as a multiple access scheme for the next generation mobile communication system, mainly led by the $3^{rd}$ Generation Partnership Project (3GPP), which is an asynchronous cellular mobile communication standard group, and the $3^{rd}$ Generation Partnership Project 2 (3GPP2), which is a synchronous cellular mobile communication standard group.

In the OFDMA system, wireless resources can be expressed in a two-dimensional time-frequency array as shown in FIG. 1. In FIG. 1, since the horizontal axis represents a time domain and the vertical axis represents a frequency domain, one resource unit can be expressed as one time-frequency square, i.e., one square space in the frequency domain represents one subcarrier, and one space in the time domain represents one OFDM symbol. For example, 8 OFDM symbols constitute one physical frame, and the frame can be defined as a Transmission Time Interval (TTI) of a forward-link channel that is transmitted from a Base Station (BS) to a Mobile Station (MS) in the OFDMA system.

For example, in FIG. 1, a resource unit composed of 8 OFDM symbols in the time domain and 16 subcarriers in the frequency domain is defined as a 'tile', which is a resource allocation unit which is allocated for data transmission in the process of scheduling MSs. FIG. 1 illustrates a 32-tile 5-MHz system bandwidth.

Meanwhile, TDD, one of the schemes for distinguishing a Forward-Link (FL) and a Reverse-Link (RL), is now under study and applied to the 2.3-GHz portable Internet system such as Wireless Broadband (WiBro), and is considered even in the Ultra Mobile Broadband (UMB) system.

TDD is a scheme in which a BS and an MS use the same frequency band in transmitting data, thereby increasing frequency efficiency. Further, the BS and the MS are allocated different time slots thereby supporting bidirectional transmission. The number of time slots allocated for each link is subject to change according to the amount of data transmitted over FL and RL for a predetermined time interval, and this can be expressed as a TDD ratio. The predetermined time interval is defined herein as a sum of the number of consecutive FL time slots and the number of consecutive RL time slots. The actual data transmission is achieved in the time zone where the defined predetermined time interval is continuously repeated.

For example, in a TDD system with a TDD ratio=1:1, FL and RL are equal in the number of time slots allocated thereto for a predetermined time interval. If the FL and RL links alternately operate in the time domain, the predetermined time interval is a time corresponding to 2 time slots, so 1 FL time slot and 1 RL time slot exist in the corresponding time interval.

Even in the case where a time interval is defined as a sum of 4 consecutive FL time slots and 4 consecutive RL time slots, since FL and RL are equal in the number of time slots allocated thereto for the corresponding time interval, the system can be considered to have a TDD ratio=1:1.

FIG. 2 is a diagram illustrating a time line that is composed of 2 consecutive FL time slots and 1 consecutive RL time slot for a TDD ratio=2:1.

The horizontal axis represents a time domain, and a square with an arrow inside represents one time slot, and means one PHYsical (PHY) frame composed of, for example, 8 OFDM symbols. Frames with a top-to-bottom arrow represent time slots allocated for FL, and frames with a bottom-to-top arrow represent time slots allocated for RL. Numerals 0 to 5 express interlace indexes, and since there are 6 interlaces for FL as shown in FIG. 2, a system supporting Hybrid Automatic Repeat reQuest (HARQ) can transmit 6 new packets within a Round Trip Time (RTT), which is the time interval from the initial packet transmission time until just before a retransmission time. For example, if a BS transmits the first subpacket of a new packet through an interlace #0 (first time slot) and an MS fails in the MS's demodulation on the subpacket, the BS retransmits the second subpacket of the corresponding packet in the next interlace #0 (tenth time slot). That is, in the HARQ system, FL RTT indicating the time from the initial transmission until before the retransmission becomes 9 TTIs.

HARQ is a combined technology of an Automatic Repeat reQuest (ARQ) technology and a Forward Error Correction (FEC) technology, generally used to increase data transmission reliability and data throughput in a packet-based mobile communication system. A receiver decodes received data by performing a predetermined inverse FEC process on the received data, and then performs Cyclic Redundancy Check (CRC) check on the decoded data to determine whether there is any error in the decoded data. If there is no error as a result of the CRC check, the receiver feeds back an ACKnowledgement (ACK) to a transmitter so that the transmitter may transmit the next data packet. However, if there is any error as a result of the CRC check, the receiver feeds back a Non-ACKnowledgement (NACK) to the transmitter so that the transmitter may retransmit the previously transmitted packet.

Through the time slots allocated for RL, ACK/NACK information and Channel Quality Indication (CQI) information are transmitted, not only for the RL data, but also for the FL data. FIG. 2 shows that ACK/NACK information for FL data transmitted through the hatched interlaces #0 and #1 are transmitted through the hatched second RL time slot (sixth time slot) in the reverse direction. That is, since TDD ratio=2:1, ACK/NACK for 2 FL time slots is transmitted through 1 RL time slot. When there is a need for retransmission due to the ACK/NACK information transmitted over RL, retransmission is achieved through the next interlaces #0 and #1. As shown in FIG. 2, there is a time interval corresponding to multiple time slots between the timing at which data is transmitted through FL time slots, the timing at which ACK/NACK is received over RL, and the timing at which retransmission is made over FL, and this is given taking into account the propagation delay between a BS and an MS, and the actual processing time required for performing modulation/demodulation and encoding/decoding.

Resources allocated for ACK/NACK information for FL data can be resources implicitly mapped to physical resources used for transmitting the FL data, or can be resources explicitly indicated through Layer 1 (L1)/Layer 2 (L2) signaling or upper layer signaling. In a 5-MHz system having, for example, 32 tiles, if all of the 32 tiles are used for data transmission through an arbitrary interlace, ACK/NACK information of a maximum size of 32 bits can be transmitted at an RL time slot, and if data is transmitted through two consecutive FL interlaces in the time domain, ACK/NACK information of a total size of 64 bits is needed.

In ACK/NACK transmission, if a half-tile that, as a resource unit, considers 8 OFDM symbols in the time domain and 8 subcarriers in the frequency domain can transmit 32 bits, as in, for example, the UMB system, then the necessary ACK/NACK information, when the amount of necessary ACK/NACK information corresponds to 32 bits, can be transmitted using the 1 half-tile. If repeated transmission is performed 4 times on an ACK/NACK signal to obtain a frequency diversity gain, 4 half-tiles are used over the entire frequency band. Therefore, from the viewpoint of the amount of resources, 2 tiles are used for ACK/NACK transmission. In addition, for a Multiple-Input Multiple-Output (MIMO) system with rank=4, a total of 2*4=8 tiles are required for ACK/NACK transmission.

In a TDD system where a ratio of the number of time slots allocated for FL transmission for a predetermined time interval to the number of time slots allocated for RL transmission is 3:2, ACK/NACK information for the data transmitted through 3 FL time slots would conventionally be transmitted to a BS through 2 RL time slots. If the amount of allocated ACK/NACK information transmitted through each RL time slot is different in this way as RL transmission corresponding to multiple FL time slots is made with multiple time slots and the number of FL time slots cannot be divided by the number of RL time slots, ACK/NACK information for FL data transmission is non-uniformly distributed for each RL time slot, i.e., in the ratio-3:2 TDD system, ACK/NACK information corresponding to FL data transmission is carried on 2 RL time slots in a ratio of 2:1 or 1:2. For example, if ACK/NACK information is transmitted in a ratio of 2:1, a maximum of 32 tiles can be allocated for data transmission in every interlace. Thus, if MIMO is not considered, 32*3=96-bit ACK/NACK information would be transmitted through 2 RL time slots. Therefore, if a ratio of 2:1 is used, 64-bit ACK/NACK corresponding to 2 FL interlaces is transmitted through the first RL time slot, and 32-bit ACK/NACK corresponding to 1 FL interlace is transmitted using the second RL time slot.

In this case, compared with time slots that transmit less ACK/NACK information, RL time slots that transmit more ACK/NACK information may impose restrictions on transmission of other information due to the ACK/NACK information. As described above, in the RL time slots can be transmitted not only the ACK/NACK information but also data and CQI information. Therefore, if a large amount of ACK/NACK information is transmitted through the RL time slots, the amount of available resources is reduced, putting limitation on resource allocation for transmission of other information except for ACK/NACK in the corresponding RL time slot. In addition, in a MIMO system with rank≧2, since the amount of necessary transmission ACK/NACK information increases in proportion to a rank value, the amount of resources over which data or CQI information can be transmitted is significantly reduced, imposing significant restrictions on transmission of information other than ACK/NACK. In this case, the transmitter would use the next RL time slot for transmission of RL data or CQI other than ACK/NACK, causing an increase, especially in RTT for RL data transmission.

SUMMARY OF THE INVENTION

An aspect of the present invention is to address at least the problems and/or disadvantages and to provide at least the advantages described below. Accordingly, an aspect of the present invention is to provide a method and apparatus for transmitting an ACK/NACK signal so as to minimize restrictions on transmission of information other than ACK/NACK in a TDD-based OFDMA system.

Another aspect of the present invention is to provide a method and apparatus for transmitting ACK/NACK information by determining the amount of ACK/NACK information allocated for an RL time slot corresponding to an FL time slot.

Further another aspect of the present invention is to provide a method and apparatus for uniformly determining the amount of ACK/NACK information allocated for an RL time slot corresponding to an FL time slot, thereby increasing a load balancing effect.

According to one aspect of the present invention, there is provided a method for transmitting control information by a Base Station (BS) in a Time Division Duplexing (TDD)-based Orthogonal Frequency Division Multiple Access (OFDMA) system. The method includes determining a TDD ratio value of a number of time slots allocated for Forward-Link (FL) and a number of time slots allocated for Reverse-Link (RL); if the TDD ratio value is not an integer, grouping Mobile Stations (MSs) into multiple groups and generating group index information; and transmitting, to the MSs, control information including the TDD ratio value and the group index information.

According to another aspect of the present invention, there is provided a method for transmitting an ACKnowledgement (ACK)/Non-ACKnowledgement (NACK) by a Mobile Station (MS) in a Time Division Duplexing (TDD)-based Orthogonal Frequency Division Multiple Access (OFDMA) system. The method includes receiving a TDD ratio value of a number of time slots allocated for Forward-Link (FL) and a number of time slots allocated for Reverse-Link (RL) and group index information from a Base Station (BS); determining an ACK/NACK transmission ratio allocated for consecutive Reverse-Link (RL) time slots of a predetermined time interval according to the TDD ratio value and the group index information; and transmitting ACK/NACK information for data transmitted through consecutive Forward-Link (FL) time slots through the consecutive RL time slots according to the determined ACK/NACK transmission ratio.

According to further another aspect of the present invention, there is provided a method for transmitting an ACKnowledgement (ACK)/Non-ACKnowledgement (NACK) by a Mobile Station (MS) in a Time Division Duplexing (TDD)-based Orthogonal Frequency Division Multiple Access (OFDMA) system. The method includes receiving a TDD ratio value of a number of time slots allocated for Forward-Link (FL) and a number of time slots allocated for Reverse-Link (RL) from a Base Station (BS); if the TDD ratio value is not an integer, allowing the consecutive RL time slots to uniformly transmit, to the BS, ACK/NACK information for data transmitted through FL time slots corresponding to the RL time slots.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

Figure 1:
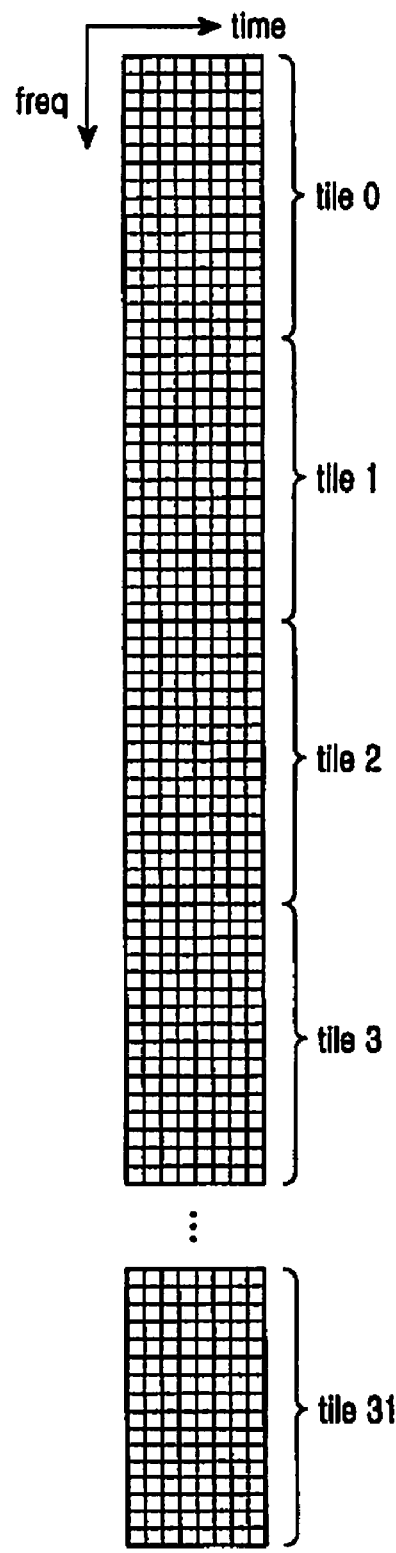
FIG. 1 is a diagram illustrating wireless resources in an OFDMA system.
Figure 2:
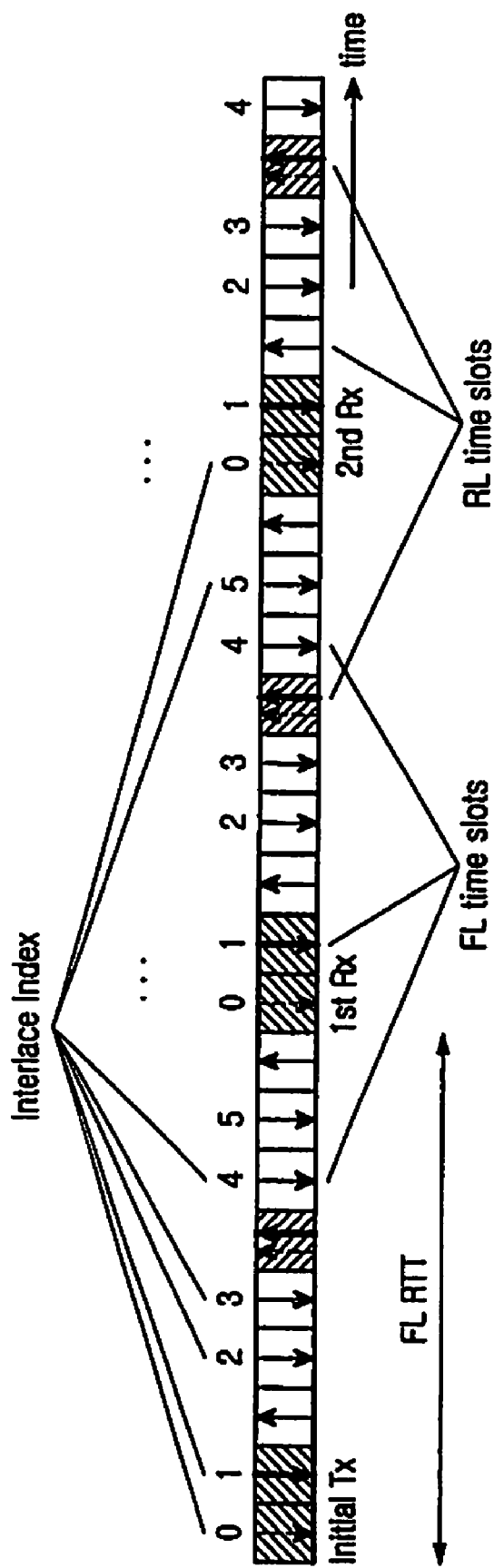
FIG. 2 is a diagram illustrating a time line for a TDD ratio=2:1.
Figure 3:
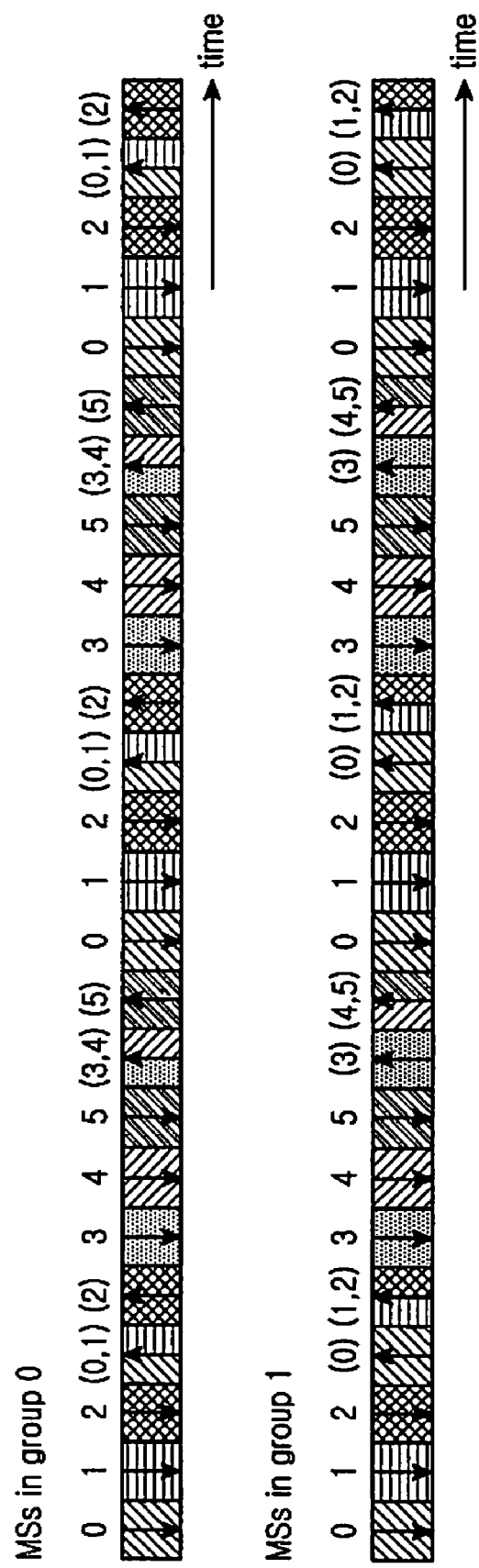
FIG. 3 is a diagram illustrating a method for transmitting ACK/NACK information through an RL time slot in a TDD-based OFDMA system according to a first exemplary embodiment of the present invention.

FIG. 3 is a diagram illustrating a method for transmitting ACK/NACK information through an RL time slot in a TDD-based OFDMA system according to a first exemplary embodiment of the present invention.

From a TDD ratio value, when the number of FL time slots cannot be divided by the number of RL time slots, the proposed method divides all MSs into as many groups as the number of RL time slots (Grouping). That is, referring to FIG. 3 where a TDD ratio is assumed to be 3:2, the number of RL time slots corresponding to 3 FL time slots is 2. Therefore, a BS divides MSs into 2 groups. Herein, the grouping target MSs can be all MSs existing in a cell or sector, or can be limited to the MSs that need scheduling for data transmission to from a BS to MSs. For an actual load balancing effect, the present invention is adapted to consider the total number of MSs that need scheduling.

Grouping for MSs on which the BS performs scheduling for consecutive FL interlaces as shown in FIG. 3 can be determined according to, for example, the following schemes.

1. Pre-fix scheme: This scheme divides (or groups) MSs on the basis of their Medium Access Control IDentifier (MAC ID) value. For example, if a MACID value of an MS is an even number, the MS is included in a group 0, and if a MACID value of an MS is an odd number, the MS is included in a group 1.

2. For each MS, a BS determines a group to which the corresponding MS will belong. That is, the BS signals information on the MS group to the MS through FL grant or upper layer signaling. For example, MSs that received group information with group index=0 using 1-bit information are included in a group 0, and MSs that received group information with group index=1 are included in a group 1.

In FIG. 3, non-parenthesized numerals on the top of FL time slots represent FL interlace indexes, and there are 6 interlaces. For example, a new packet transmitted in an interlace #4 ($7^{th}$ time slot) will undergo retransmission in the next same interlace #4 ($17^{th}$ time slot) in the time domain.

Parenthesized numerals on the top of RL time slots represent interlace indexes of FL time slots corresponding to ACK/NACK information transmitted by the corresponding RL time slots. For example, (0,1) means that ACK/NACK information for the data packets transmitted through FL interlaces #0 and #1 is transmitted using the corresponding RL time slots. Arbitrary RL time slots are mapped to FL interlace indexes 0 and 1, and when the propagation delay between a BS and an MS and the processing time required for modulation/demodulation and encoding/decoding are substantially taken into consideration, the corresponding RL time slots transmit ACK/NACK information for the data transmitted not through the just previous FL interlaces #0 and #1, but through the second previous FL interlaces #0 and #1. The actual mapping in the time domain of the FL interlaces corresponding to ACK/NACK information that arbitrary RL time slots transmit will be omitted herein. That is, the mapping only between RL ACK/NACK information and the RL information's associated FL interlace indexes is taken into consideration.

Referring to FIG. 3, MSs belonging to group 0 transmit ACK/NACK information for the first two interlaces among the 3 FL interlaces through the first time slot among the 2 consecutive RL time slots, and transmit ACK/NACK information for the remaining 1 FL interlace through the second RL time slot, as shown in the top drawing (MSs in group 0) of FIG. 3.

Meanwhile, MSs belonging to group 1 transmit ACK/NACK information for the last 2 interlaces among the 3 FL interlaces through the second time slot among the 2 consecutive RL time slots, and transmit ACK/NACK information for first one RL time slot through the first FL time slot, as shown in the bottom drawing (MSs in group 1) of FIG. 3. From the viewpoint of one group, even though the amount of ACK/NACK information between consecutive RL time slots is non-uniform as in the conventional technology, the average amount of ACK/NACK information that each RL time slot transmits can be almost equal by performing the grouping on MSs as stated above.

For example, if data is transmitted through 3 interlaces and all resources are used for data transmission in every interlace, ACK/NACK information of a maximum of 32*3=96 bits may be transmitted over the RL. When the number of MSs that should be subject to scheduling is 20, 10 MSs belonging to group 0 should transmit more ACK/NACK information through the first RL time slot, and the remaining 10 MSs belonging to group 1 should transmit more ACK/NACK information through the second RL time slot.

Therefore, if the total number of bits of ACK/NACK information that each group should transmit is equal, MSs in group 0 transmit 32 bits in the 48-bit ACK/NACK information through the first RL time slot, and transmit 16 bits through the second time slot.

On the other hand, contrary to MSs in group 0, MSs in group 1 transmit 16 bits in the 48-bit ACK/NACK information through the first RL time slot, and transmit 32 bits through the second RL time slot.

As a result, the amount of ACK/NACK information transmitted through the first and second RL time slots becomes 48 bits on average, bringing a load balancing effect in which each RL time slot transmits the almost same amount of ACK/NACK information.

Figure 4:
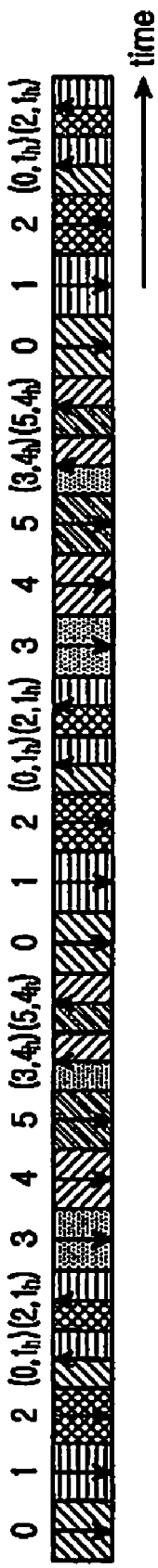
FIG. 4 is a diagram illustrating a method for transmitting ACK/NACK information through an RL time slot in a TDD-based OFDMA system according to a second exemplary embodiment of the present invention.

FIG. 4 is a diagram illustrating a method for transmitting ACK/NACK information through an RL time slot in a TDD-based OFDMA system according to a second exemplary embodiment of the present invention.

From a TDD ratio value, when the number of FL time slots cannot be divided by the number of RL time slots, in the exemplary case of FIG. 3 where the TDD ratio value is 3:2, the proposed method allows each of the 2 consecutive RL time slots to transmit ACK/NACK information for 1.5 FL interlaces. ACK/NACK information for the data packets transmitted through an interlace #1 among the 3 FL interlaces #0 to #2, for example, ACK/NACK information corresponding to FL data transmission, which is allocated resources corresponding to the first ½ resource zone among the total of 32 tiles and transmitted therethrough, is transmitted through the first RL time slot, and ACK/NACK information corresponding to FL transmission, which uses the resources belonging to the remaining ½ resource zone, is transmitted using the second RL time slot.

Alternatively, ACK/NACK corresponding to the FL data transmitted using, for example, even tiles among all tiles can be transmitted through the first RL time slot, and ACK/NACK corresponding to the FL data transmitted using odd tiles can be transmitted through the second RL time slot.

Therefore, the assumption that an FL interlace corresponding to ACK/NACK information that an RL time slot transmits is $(0,1_h)$ as shown in FIG. 4, means that the corresponding RL time slot transmits all packets transmitted through an FL interlace #0, and ACK/NACK information corresponding to ½ data of the packets transmitted through an FL interlace #1. In this case, the FL interlace corresponding to ACK/NACK information that uses two ½ RL time slots among all transmission packets can be set, not as a fixed interlace, but as an arbitrary interlace among multiple consecutive FL interlaces. Therefore, information on the FL interlace to which the amount of ACK/NACK information should be distributed can be assumed to be previously agreed upon between a BS and an MS, or can be provided to an MS by a BS through L1/L2 or upper layer signaling.

In $(0,1_h)$, a subscript h means 'half'. When a TDD ratio is 3:2, two RL time slots share loads of FL time slots half-and-half. Therefore, for an FL interlace #1, ACK/NACK information for the corresponding interlace is distributed to two RL time slots half-and-half before transmission of the ACK/NACK information.

In the case where an amount of ACK/NACK information, obtained by dividing ACK/NACK information for the data packets transmitted through an arbitrary FL interlace by the number of consecutive RL time slots is transmitted through each RL time slot as shown in FIG. 4 (since the number of consecutive RL time slots is 2 in FIG. 4, ACK/NACK information corresponding to an arbitrary FL interlace is transmitted by each RL time slot half-and-half), if the amount of ACK/NACK information divided into equal sizes is not a positive integer, the amount of ACK/NACK information that each RL time slot transmits is set to a positive integer so that a difference in the amount of ACK/NACK information between RL time slots is minimized. For example, assuming that ACK/NACK of a total of 23 bits is transmitted for FL data transmission for a TDD ratio value=3:2 as shown in FIG. 4, since the amount of ACK/NACK information becomes 11.5 bits per RL time slot, which is not a positive integer, 11-bit ACK/NACK is transmitted in one arbitrary RL time slot, and 12-bit ACK/NACK information is transmitted in the remaining one RL time slot. If M=(total amount of necessary transmission ACK/NACK information) mod n, where n denotes the number of consecutive RL time slots, the amount of ACK/NACK information that each RL time slot should transmit is finally determined according to the value M, as follows.

For M=0, each RL time slot transmits ACK/NACK information corresponding to the same positive integer.

For M=1, one arbitrary RL time slot transmits ACK/NACK information of 1 more bit, compared with the remaining time slots.

For M=2, two arbitrary RL time slots transmit ACK/NACK information of 1 more bit, compared with the remaining time slots.

For M=n−1, (n−1) arbitrary RL time slots transmit ACK/NACK information of 1 more bit, compared with the remaining time slots.

For M≠0, the amount of ACK/NACK information each RL time slot transmits can be set to a positive integer so that a difference in the amount of ACK/NACK information between RL time slots is minimized, or the amount of ACK/NACK information each time slot transmits can be determined such that a larger amount of ACK/NACK information is transmitted only in a particular RL time slot, and ACK/NACK information, the amount of which corresponds to the same positive integer, is transmitted in the remaining RL time slots. Information on the RL time slot that transmits more ACK/NACK information can be previously agreed upon between a BS and an MS, or can be provided to an MS by a BS through L1/L2 or upper layer signaling.

Figure 5:
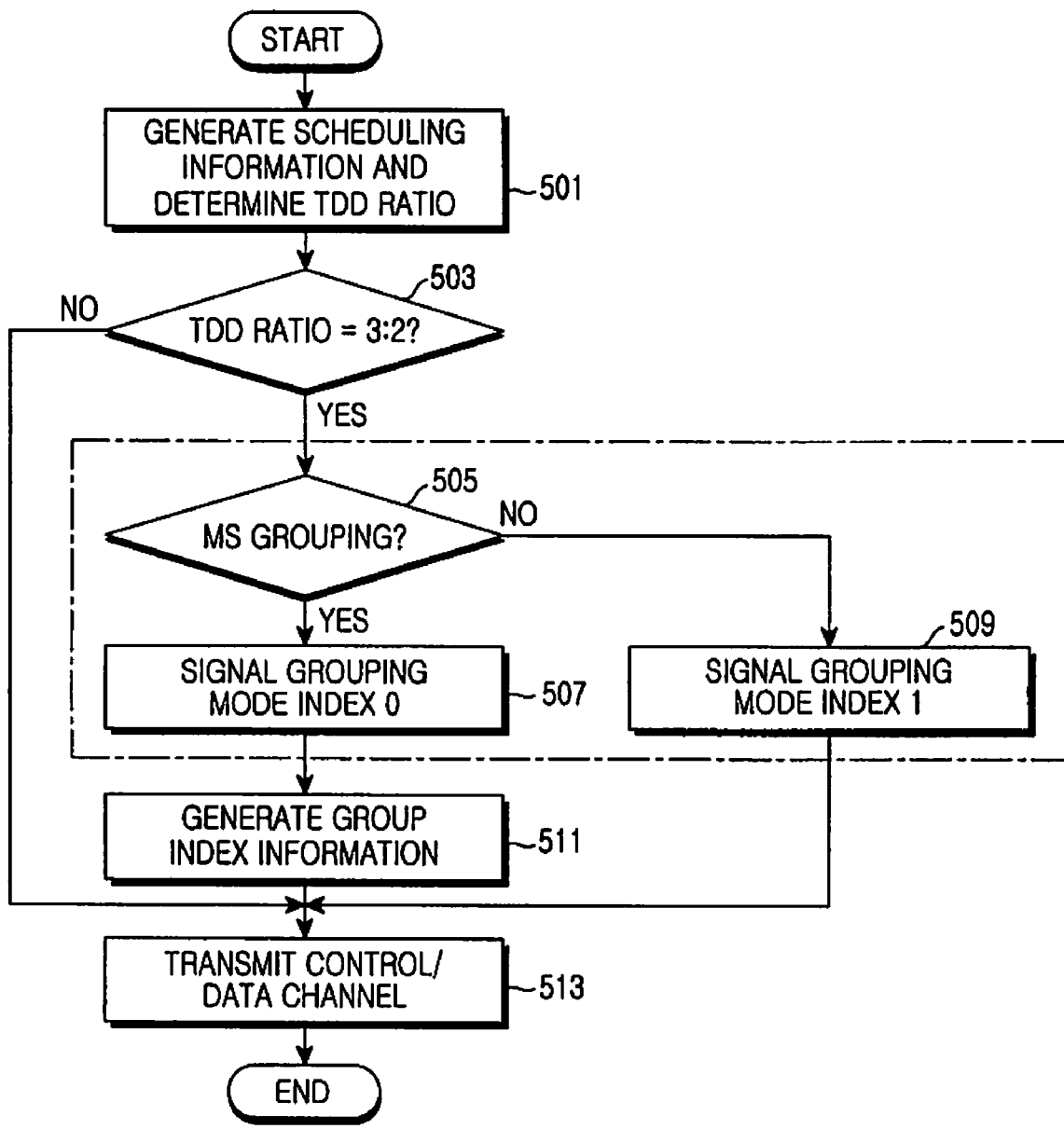
FIG. 5 is a flowchart illustrating an operation of a transmitter according to an exemplary embodiment of the present invention.

FIG. 5 is a flowchart illustrating an operation of a transmitter according to an exemplary embodiment of the present invention.

In step 501, a BS generates scheduling information for a data channel, for MSs requiring FL data transmission, and determines a TDD ratio value to use. The TDD ratio value is transmitted herein to an MS(s) through a separate broadcasting channel or physical channel, and the BS can transmit the TDD ratio value together when transmitting a control channel and a data channel in step 513.

Thereafter, the BS checks in step 503 if the TDD ratio is 3:2. That is, the BS checks whether from the TDD ratio value, the number of FL time slots can be divided by the number of RL time slots. If the TDD ratio is not 3:2, the BS, without applying the present invention, proceeds to step 513 where the BS transmits to the MS a data channel together with a control channel including scheduling information and control information.

However, if the TDD ratio indicates that the number of consecutive RL time slots is greater than 1, e.g., if the TDD ratio value is 3:2 as shown in FIG. 3 and FIG. 4, the BS determines in step 505 whether or not the BS will perform MS grouping using separate 1-bit signaling to carry out load balancing, and provides the corresponding information to the MS. That is, if the BS intends to obtain load balancing through MS grouping, the BS sets a grouping mode index to '0' and transmits the grouping mode index to the MS in step 507 so that the MS can perceive the execution of the MS grouping. Unless the BS determines a group by the Pre-fix scheme, the BS generates grouping information in step 511. The 'grouping information' as used herein refers to group index information indicating to which group each MS belongs. The group index information can be transmitted to the MS using upper layer signaling, or can be transmitted to the MS through L1/L2 signaling. When the group index information is transmitted through L1/L2 signaling, a control channel including both the group index information and the scheduling information is transmitted to the MS together with a data channel.

However, if the BS determines not to perform MS grouping in step 505, i.e., if the grouping mode index is set to '1', the BS, intending to obtain a load balancing effect without using MS grouping, sets in step 509 the grouping mode index to '1' and transmits the grouping mode index to the MS. Thereafter, the BS directly transmits a data channel and a control channel including therein scheduling information.

Although the BS can select a load balancing scheme from among the method (transmission of grouping mode index 0) for achieving load balancing using MSs grouping and a method (transmission of grouping mode index 1) for obtaining a load balancing effect without using MSs grouping as described in FIG. 5, the BS can originally determine one of the two load balancing methods without considering the process in the block indicated by a dotted line, i.e., when the BS intends to achieve load balancing by applying MS grouping, the BS only needs to transmit, to the MS, a data channel and a control channel including group index information without the need to transmit the grouping mode index. Meanwhile, when the BS intends to achieve load balancing even without using MS grouping, the BS may not perform separate signaling to the MS.

Figure 6:
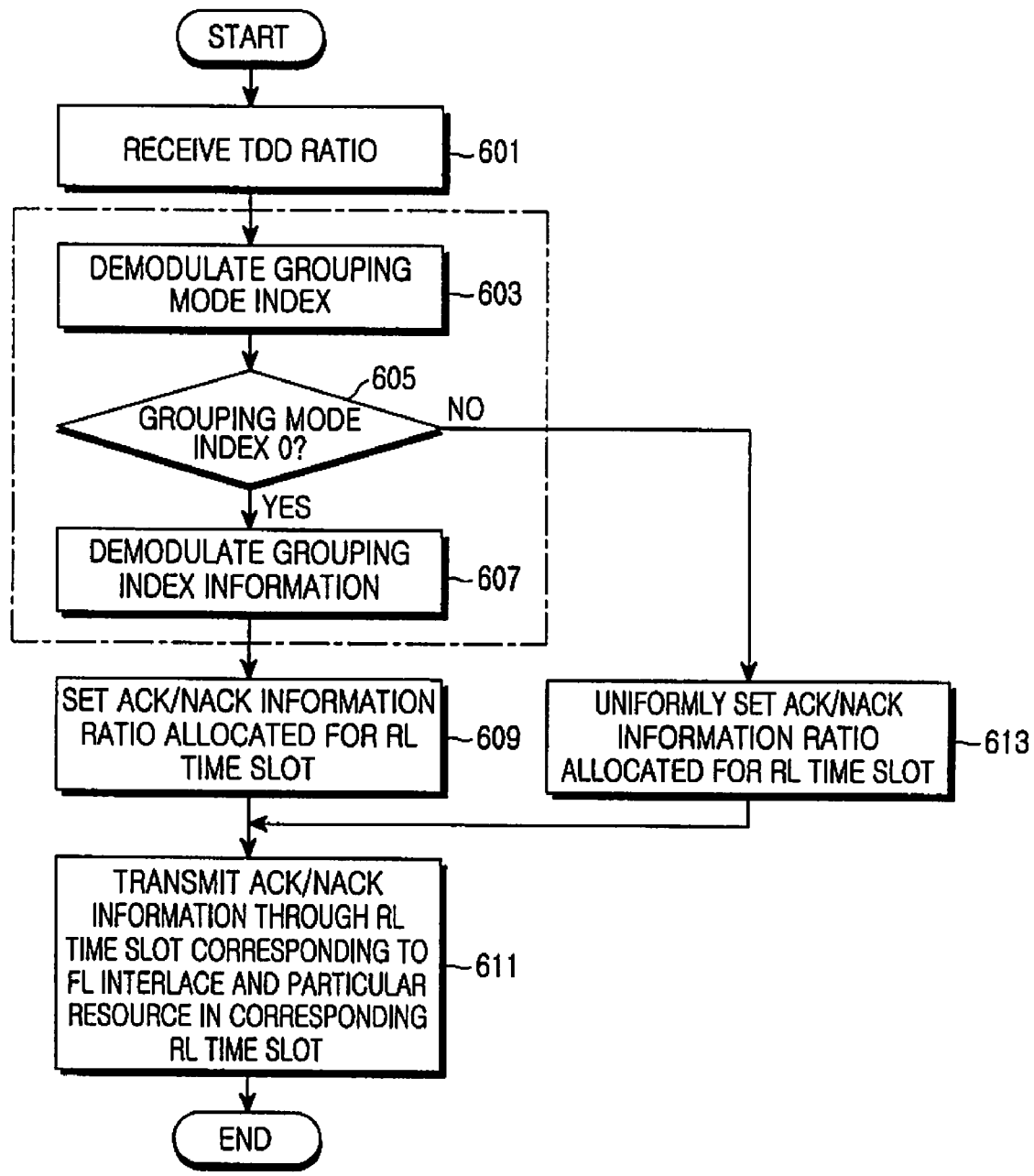
FIG. 6 is a flowchart illustrating an operation of a receiver according to an exemplary embodiment of the present invention.

FIG. 6 is a flowchart illustrating an operation of a receiver according to an exemplary embodiment of the present invention.

In step 601, an MS receives TDD ratio information through a separate broadcasting channel or physical channel, and demodulates the received TDD ratio information. In step 603, the MS receives and demodulates grouping mode index information transmitted by the BS. Thereafter, the MS determines in step 605 if the demodulated grouping mode index value is '0'. If the demodulated grouping mode index value is '0', the MS, using MS grouping, demodulates group index information included in a control channel in step 607. If an MS group to which each MS belongs is determined according to the demodulated group index information, the MS sets in step 609 a ratio of ACK/NACK information allocated between RL time slots as previously defined between the BS and the MS, or as reported by the BS through separate signaling. For example, MSs belonging to a group 0 set a ratio value of ACK/NACK information allocated for two RL time slots to 2:1, and MSs belonging to a group 1 set a ratio of ACK/NACK information allocated for 2 RL time slots to 1:2, according to a first exemplary embodiment of the present invention.

As another example, an MS sets an ACK/NACK transmission ratio to a particular value. That is, the MS allows 2 consecutive RL time slots to transmit the uniform amount of ACK/NACK information for 1.5 FL interlaces. In addition, the ACK/NACK information corresponding to FL data transmission, which is allocated resources corresponding to the first ½ resource zone and transmitted therethrough, is transmitted through the first RL time slot, and ACK/NACK information corresponding to FL data transmission, which uses the resources belonging to the remaining ½ resource zone, is transmitted using the second RL time slot, according to a second exemplary embodiment of the present invention.

Thereafter, in step 611, the MS transmits ACK/NACK information with particular resources in the RL time slot according to the set ratio of ACK/NACK information. Therefore, if an arbitrary MS receives 0 as group index information, the MS transmits ACK/NACK for FL interlaces #0 and #1 using particular resources in the first RL time slot. Herein, the resources allocated for ACK/NACK can be resources that are dependent on FL resources (i.e., RL resources implicitly mapped to resources used for FL data transmission), or can be RL resources explicitly indicated by the BS.

If the demodulated grouping mode index value is '1', the MS proceeds to step 613 where the MS does not need to demodulate group index information, determines that MS grouping is not used, and uniformly sets a ratio of ACK/NACK information allocated for RL time slots, i.e., a system using a TDD ratio=3:2 sets a 1.5:1.5 ratio for 2 RL time slots so that each RL time slot transmits ½ of the amount of ACK/NACK information corresponding to FL data transmission. Thereafter, in step 611, through the first RL time slot, the MS transmits ACK/NACK information through all resources allocated for the data transmitted through an FL interlace #0 and through RL resources implicitly mapped to ½ of the resources allocated for the data transmitted through an FL interlace #1. Further, through the second RL time slot, the MS transmits ACK/NACK information through all resources allocated for the data transmitted through an FL interlace #2 and through RL resources implicitly mapped to the remaining ½ of the resources allocated for the data transmitted through the FL interlace #1.

Figure 7:
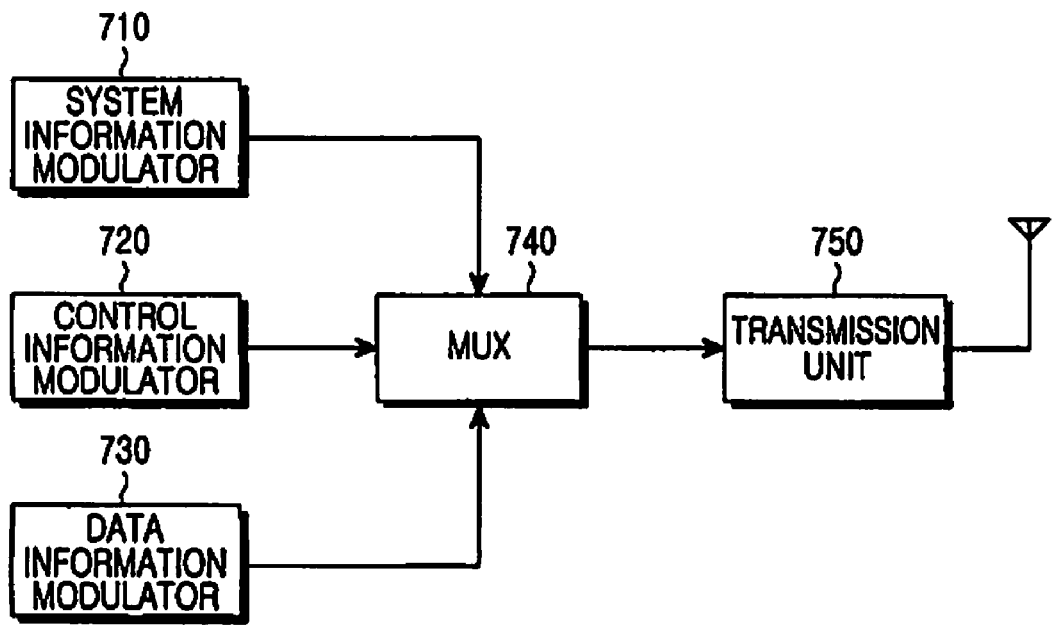
FIG. 7 is a block diagram illustrating a structure of a transmitter according to an exemplary embodiment of the present invention.

FIG. 7 is a block diagram illustrating a structure of a transmitter according to an exemplary embodiment of the present invention.

The transmitter includes a system information modulator 710, a control information modulator 720, a data information modulator 730, a multiplexer 740, and a transmission unit 750.

The system information modulator 710 forms a broadcasting channel by performing CRC attachment, encoding, channel interleaving, repetition, scrambling, and modulation processes on the generated system-related information including a TDD ratio value.

The control information modulator 720 generates a control channel by performing CRC attachment, scrambling, encoding, channel interleaving, repetition, and modulation processes on the scheduling information for FL/DL data transmission and transmission group index information.

The data information modulator 730 generates a data channel for the data that a BS intends to transmit to a MS, through the similar processes to the above-stated processes.

The multiplexer 740 multiplexes the system information, the control information, and the data information.

The transmission unit 750 generates and transmits an OFDM signal through the processing process of the common OFDM-based mobile communication system, such as Inverse Fast Fourier Transform (IFFT) and multi-antenna transmission.

Figure 8:
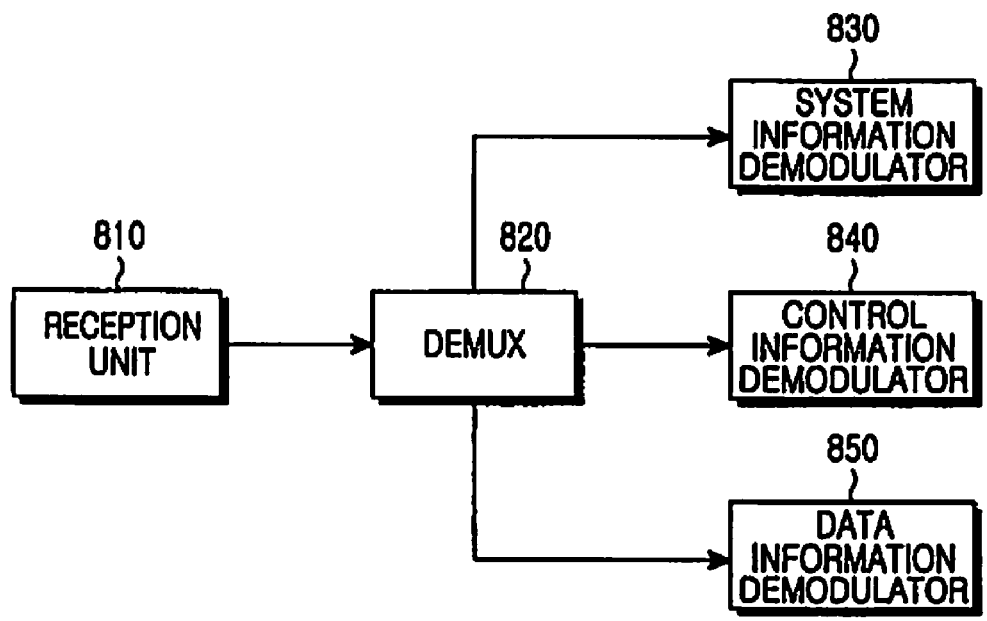
FIG. 8 is a block diagram illustrating a structure of a receiver according to an exemplary embodiment of the present invention.

FIG. 8 is a block diagram illustrating a structure of a receiver according to an exemplary embodiment of the present invention.

The receiver includes a reception unit 810, a demultiplexer 820, a system information demodulator 830, a control information demodulator 840, and a data information demodulator 850.

The receiver is constructed in the reverse order of the transmitter of FIG. 7, and the reception unit 810 receives a signal through the processing process of the common OFDM-based mobile communication system, such as single/multiple receive antennas and Fast Fourier Transform (FFT).

The demultiplexer 820 demultiplexes a broadcasting channel, a control channel, and a data channel from the received signal.

The system information demodulator 830 demodulates system information by inversely performing the processes performed in the system information modulator 710 of the transmitter, i.e., by performing demodulation, combining, channel deinterleaving, descrambling and CRC check, on the broadcasting channel extracted from the demultiplexer 820.

The control information demodulator 840 and the data information demodulator 850 demodulate control information and data information by inversely performing the processes performed in the control information modulator 720 and the data information modulator 730 of the transmitter on the control information and the data information, respectively. In addition, according to the first exemplary embodiment of the present invention, the control information demodulator 840 and the data information demodulator 850 receive, from the BS, grouping index information and a TDD ratio value indicating a ratio of the number of time slots allocated for each link according to the amount of data transmitted over FL and RL for a predetermined time interval, determine an ACK/NACK transmission ratio allocated for consecutive RL time slots according to the TDD ratio value and the group index information, and allocate ACK/NACK information for the data transmitted through consecutive FL time slots according to the determined ACK/NACK transmission ratio.

Although not illustrated, a transmission unit transmits the allocated ACK/NACK information through the consecutive RL time slots.

As is apparent from the foregoing description, the present invention can efficiently transmit ACK/NACK information over RL in the TDD-based OFDMA system, thereby reducing the restriction on RL transmission of information other than ACK/NACK.

In addition, the present invention can achieve the load balancing effect through proper mapping between ACK/NACK information and RL time slots in transmitting ACK/NACK through the RL time slots, thereby reducing the restriction on RL transmission of information other than ACK/NACK.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A method for transmitting control information by a Base Station (BS) in a Time Division Duplexing (TDD)-based Orthogonal Frequency Division Multiple Access (OFDMA) system, the method comprising:
   determining a value obtained by dividing a number of time slots allocated for a Forward-Link (FL) by a number of time slots allocated for a Reverse-Link (RL);
   if the value is not a positive integer but is a fraction, grouping Mobile Stations (MSs) into multiple groups and generating group index information; and
   transmitting, to the MSs, control information including the value and the group index information.

2. The method of claim 1, further comprising:
   if the value is not a positive integer but is a fraction, providing the group index information to the MSs through signaling of a predetermined number of bits.

3. The method of claim 1, wherein the group index information includes information indicating to which group each MS belongs.

4. A method for transmitting an ACKnowledgement (ACK)/Non-ACKnowledgement (NACK) by a Mobile Station (MS) in a Time Division Duplexing (TDD)-based Orthogonal Frequency Division Multiple Access (OFDMA) system, the method comprising:
   receiving a value obtained by dividing a number of time slots allocated for a Forward-Link (FL) by a number of time slots allocated for a Reverse-Link (RL) and group index information from a Base Station (BS);
   determining an ACK/NACK transmission ratio allocated for consecutive Reverse-Link (RL) time slots of a predetermined time interval according to the value and the group index information; and
   transmitting ACK/NACK information for data transmitted through consecutive Forward-Link (FL) time slots through the consecutive RL time slots according to the determined ACK/NACK transmission ratio.

5. The method of claim 4, wherein the consecutive RL time slots transmit the ACK/NACK information for data transmitted through the consecutive FL time slots is transmitted according to an interlace index of an FL time slot corresponding to ACK/NACK information transmitted by the consecutive RL time slots.

6. The method of claim 4, wherein the group index information includes information indicating to which group each MS belongs.

7. A method for transmitting an ACKnowledgement (ACK)/Non-ACKnowledgement (NACK) by a Mobile Station (MS) in a Time Division Duplexing (TDD)-based Orthogonal Frequency Division Multiple Access (OFDMA) system, the method comprising:
   receiving a value obtained by dividing a number of time slots allocated for a Forward-Link (FL) by a number of time slots allocated for a Reverse-Link (RL) from a Base Station (BS); and
   if the value is not a positive integer but is a fraction, allowing the consecutive RL time slots to uniformly transmit, to the BS, ACK/NACK information for data transmitted through FL time slots corresponding to the RL time slots.

8. The method of claim 7, further comprising:
   transmitting ACK/NACK information through an interlace index of an FL time slot corresponding to ACK/NACK information transmitted by the RL time slots.

9. An apparatus for transmitting control information in a Base Station (BS) for a Time Division Duplexing (TDD)-based Orthogonal Frequency Division Multiple Access (OFDMA) system, the apparatus comprising:
   a modulation unit for determining a value obtained by dividing a number of time slots allocated for a Forward-Link (FL) by a number of time slots allocated for a Reverse-Link (RL), and if the value is not a positive integer but is a fraction, grouping Mobile Stations (MSs) into multiple groups and generating group index information; and
   a transmission unit for transmitting, to the MSs, control information including the value and the group index information.

10. The apparatus of claim 9, wherein the group index information includes information indicating to which group each MS belongs.

11. An apparatus for transmitting an ACKnowledgement (ACK)/Non-ACKnowledgement (NACK) in a Mobile Station (MS) for a Time Division Duplexing (TDD)-based Orthogonal Frequency Division Multiple Access (OFDMA) system, the apparatus comprising:

a reception unit for receiving, from a Base Station (BS), group index information and a value obtained by dividing a number of time slots allocated for a Forward-Link (FL) by a number of time slots allocated for a Reverse-Link (RL);

an allocation unit for determining an ACK/NACK transmission ratio allocated for consecutive RL time slots according to the value and the group index information, and allocating ACK/NACK information for data transmitted through the consecutive FL time slots according to the determined ACK/NACK transmission ratio; and a transmission unit for transmitting the allocated ACK/NACK information through the consecutive RL time slots.

12. The apparatus of claim 11, wherein the consecutive RL time slots transmit ACK/NACK information for data transmitted through the consecutive FL time slots according to an interlace index of an FL time slot corresponding to ACK/NACK information transmitted by the consecutive RL time slots.

13. The apparatus of claim 11, wherein the group index information includes information indicating to which group each MS belongs.

* * * * *